Feb. 23, 1932.  H. L. PATTERSON  1,846,750
ANCHORING DEVICE
Filed Sept. 3, 1929   2 Sheets-Sheet 1

Inventor
Harvey L. Patterson
By Lawrence and
Van Centwerp
Attorneys

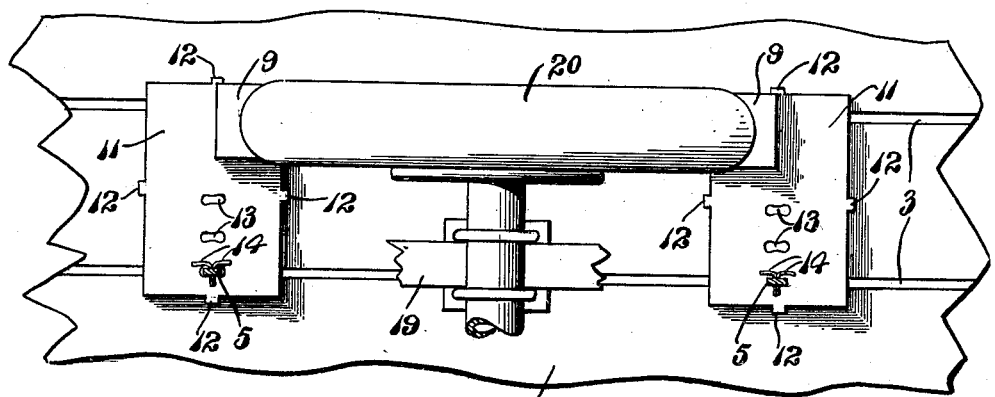
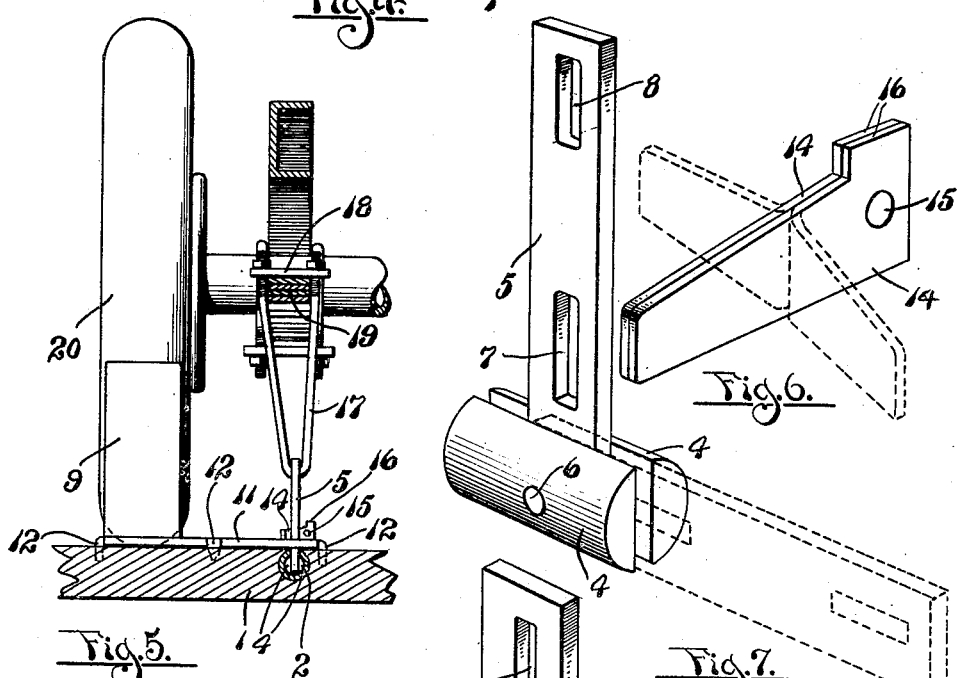

Patented Feb. 23, 1932

1,846,750

UNITED STATES PATENT OFFICE

HARVEY L. PATTERSON, OF GRAND RAPIDS, MICHIGAN, ASSIGNOR TO TOM G. BOMAN, OF GRAND RAPIDS, MICHIGAN

ANCHORING DEVICE

Application filed September 3, 1929. Serial No. 389,903.

This invention relates to an anchoring device particularly adapted for securing and anchoring motor vehicles to the floors of railroad cars.

It is a primary object and purpose of the present invention to provide a very practical and efficient anchoring device for motor vehicles which, when it is not in use, is entirely out of the way and does not interfere with the use of the car for any other purpose. With the device of my invention a motor vehicle may be securely anchored to the floor of the car and held against movement.

An understanding of the invention and the construction embodying the same may be had from the following description, taken in connection with the accompanying drawings, in which, Fig. 1 is a fragmentary plan view illustrating a motor vehicle chassis secured to the floor of a railroad car, using my invention.

Fig. 4 is a fragmentary enlarged plan view, with certain parts in section, showing the relation of the anchoring blocks to a wheel of the motor vehicle.

Fig. 5 is a fragmentary transverse section substantially on the plane of 5—5 of Fig. 2.

Figs. 6 and 7 are perspective views of details of structure used to secure the motor vehicle in place and, Fig. 8 is a modified form of construction of member equivalent to that shown in Fig. 7.

Like reference characters refer to like parts in the different figures of the drawing.

Figure 1:
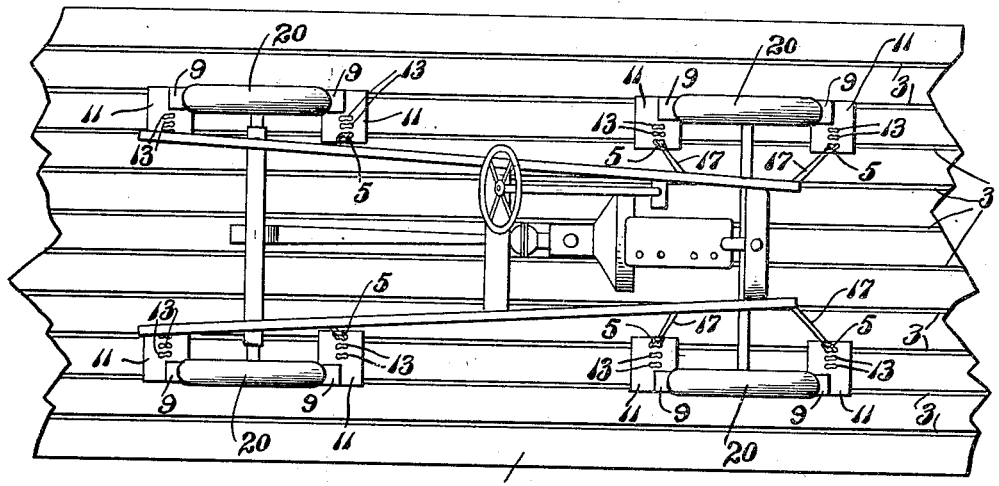
Figure 2:
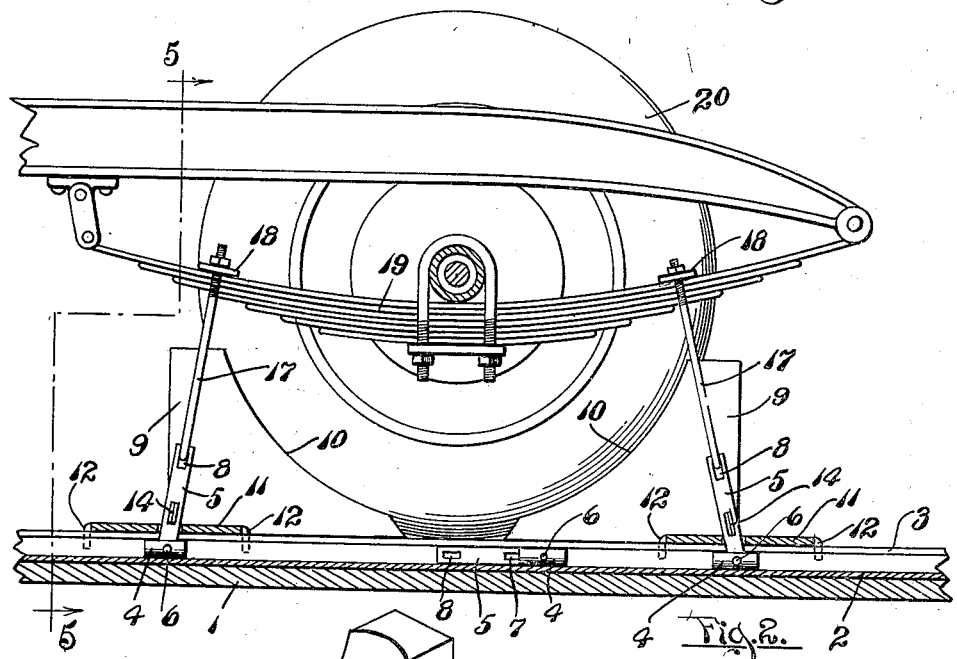
Fig. 2 is a fragmentary vertical section illustrating in elevation the connection of the car to the floor at one point.
Figure 3:
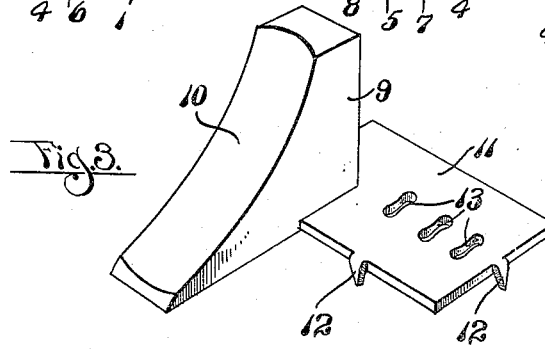
Fig. 3 is a perspective view of one of the anchoring blocks, a number of which are used with each car secured.

In the construction of the invention, the floor of the car may be directly equipped or a false floor may be placed above the car floor. In said floor or the car or in the false floor, indicated at 1, a plurality of spaced apart parallel tubes 2 are located lengthwise of the car and are slotted longitudinally, as at 3, at their upper sides. The tubes 2 are located below the upper side of the floor or false floor so that all that appears from above are the parallel slots 3 as shown in Fig. 1, the upper sides of the tubes being substantially flush with the upper side of the floor or subfloor.

In each of the tubes 2 described, a plurality of devices are slidably mounted. Each of said devices includes two members 4 (see Fig. 7) which are nearly of semi-cylindrical form, having their flat sides parallel and spaced apart, between which one end of a flat bar 5 is located; and a pivot pin 6 passes through the members 4 and the end of the bar 5 so that the bar 5 may be turned to different positions, one being indicated in full lines in Fig. 7 and another in dotted lines. Each bar 5 has two openings therethrough, one a lower rectangular opening 7 and the other an upper rectangular opening 8.

The devices described may be shifted to different positions in the length of tubes 2, and when not in use the bars 5 may be turned downwardly to lie within the tubes so that the floor presents a smooth appearance broken only by the slots at 3; and whenever necessary for use the bars 5 may be lifted toward vertical position through the slots 3. Two of the devices consisting of the parts 4 and a bar 5 are required in anchoring each wheel of a motor vehicle.

In addition, with each wheel of the motor vehicle a block 9 is used at each side, each block being formed with a curved side 10 to engage against the wheel tire. The blocks 9 are positioned vertically and each has connected thereto a horizontal plate 11 from which a plurality of downwardly extending integral securing prongs 12 project. Each plate 11 also has a plurality of spaced apart openings 13 therethrough, each large enough to pass the bar 5 through it.

The lower opening 7 in each bar 5 is of a size that a cotter pin structure may be passed therethrough. Such cotter pin structure comprises two plates 14 of flat metal lying side by side and secured together adjacent one end by a rivet 15 above which the plates are extended for a short distance indicated at 16, the part 16 serving as a stop to prevent passage of the same completely through an opening 7.

In anchoring a wheel of a motor vehicle after the motor vehicle has been properly located on the floor, two of the devices, each consisting of the parts 4 and a bar 5 are slid along the proper tube 2 and one of the devices, consisting of block 9 and plate 11, is associated with each bar 5, the bar being passed upwardly through an opening 13 in the plate 11. The devices, as thus associated together, are brought against opposite sides of the tire of the motor vehicle wheel and when properly located the securing prongs 12 are driven into the floor and after being thus driven the cotter construction is inserted through the opening 7 and the ends of the plates 14 bent laterally. This prevents any upward movement of the plates 11 and holds them and the connected blocks 9 against disconnection from the floor. A U-bolt 17 is passed through the opening 8 in the upper end of each bar 5 and extends to the adjacent leaf spring 19. The ends of the U-bolt pass to each side of the leaf spring, a plate 18 is located over the leaf spring and the ends of the U-bolt pass through the plate and receive nuts threaded thereon which may be tightened to securely bind the parts together. This operation of securing the motor vehicle is performed with respect to each wheel thereof.

It is evident from the foregoing that a very secure anchoring construction is provided for anchoring motor vehicles to the floor of a railroad car. The devices described are very easily attached and are quite as easily removed. It is of course to be understood that in case a false floor is used above the regular floor of a car, it does not have to cover the entire floor of the car but only be located at the proper places to come underneath the wheels of a motor vehicle. Where the tubes 2 are located directly in the floor of a railroad car, when the car is to be used to ship other things than motor vehicles those parts of the device mounted in the tubes 2 are entirely received therein. The lower end of the bar 5, instead of being equipped with the members 4, may be provided with a ball 4a as shown in Fig. 8, but the operation will not be changed in any way. However, the ball can turn in the tube and thus the bar 5 can properly aline itself with the member extending upwardly therefrom. The invention is defined in the appended claims and is to be considered comprehensive of all forms of structure coming within the scope thereof.

I claim:

1. In a construction of the class described, means for anchoring an automobile on a floor on which it is located comprising, a vertical block having a curved side, two of said blocks being used with each wheel and disposed so that the curved sides thereof engage against the wheel tire at opposite lower portions of the tire, a flat metal plate secured to each block and lying against the floor, bars having slidable connection to the floor for adjustment to different positions thereon, one passing through each plate and extending upwardly, means passing through each of said bars above said plates for holding the plates against upward movement, and means connected to the upper end of each bar and adapted to extend to and detachably connect with the springs of the automobile, for the purposes described.

2. In a construction of the class described, a supporting floor, a plurality of bars mounted on said floor for adjustment to different positions in the length of the floor, a flat plate through which each of said bars extends, means passing through each bar above each plate for holding it against upward movement with respect to the floor, and means connected to the upper end of each bar and adapted to extend upwardly therefrom and provided with means at its upper end to detachably connect with the springs or parts adjacent thereto of an automobile located upon the floor.

3. A construction containing the elements in combination defined in claim 2, each of said plates having downwardly extending pointed prongs adapted to be driven into the floor and held against disconnection therefrom by said means passing through the bars above the plates.

4. In a construction of the class described, a horizontal floor, a plurality of longitudinal guide members located lengthwise of the floor and below the upper side thereof and having slots lengthwise thereof in their upper sides, a plurality of members slidably mounted in each guide member a bar connected with each of said last members adapted to be turned to pass through the slot thereof to a position below the floor or to an upper position where it extends through the slot above the floor, and means connected with the free end of each of said bars having means at its free end for engaging with and securing an article placed upon the floor against movement.

5. A construction containing the elements in combination defined in claim 4, each of said bars having two spaced apart openings therethrough, one adjacent the free end of the bar, a horizontal plate having an opening therethrough through which the bar may pass and means for connecting said plate with the floor, means to pass through the other of said openings in the bar above the plate and thereby hold the plate against upward movement, the means connected to the free end of each bar comprising a rod bent between its ends and passing through the opening adjacent the free end of each bar, and a cross bar through which the ends of said rod pass, the ends of the rod being threaded to receive nuts.

6. In a construction of the class described, a supporting floor, a longitudinal guide located in said floor below the upper side thereof and slotted lengthwise at its upper side, a bar, means at one end of the bar received in said guide permitting the bar to be turned to lie within the guide or extend through the slot thereof, and a rod bent between its ends passing through the outer end of said bar the ends of said rod being threaded to receive nuts.

7. In a device of the class described, means for holding an automobile wheel against movement in one direction over a floor on which it is located comprising, a vertically positioned block having one side thereof curved to conform to and engage against the outer side of a tire on the wheel, a flat horizontal plate of metal secured at the lower part of said block to lie flat against the floor, and downwardly extending pointed prongs integral with and bent from the plate adapted to be driven into the floor.

8. In a construction of the class described, a supporting floor having a longitudinal guide member longitudinally slotted at its upper side and located below the upper side of the floor, a member slidably mounted in said guide, a bar connected at one end to said member whereby said bar may be received in the guide or turned to a position where it extends above the floor, means connected with the free end of said bar adapted to be detachably connected to a motor vehicle placed on the floor and additional means also cooperatively associated with said bar, said means both being adapted to hold the motor vehicle in anchored position.

9. In a construction of the class described, a floor, a guide member located therein, said guide member having an undercut slot, a member slidably mounted in said guide member, said member having a ball at its lower end, said ball riding in said guide member and being of greater diameter than the width of the slot whereby it is prevented from passing therethrough, said member also having a bar portion integrally connected to the said ball, said bar portion being adapted to extend upwardly through the said slot and means connected with the said bar portion for engaging with and securing an article placed upon the floor against movement.

10. In a device of the class described, means for securing a wheel of an automobile on a supporting floor comprising a block having a curved side to engage against the wheel tire, a horizontal plate connected to the block to lie flat above said floor, said plate having an opening therethrough, means passing through the opening for attaching the plate to said floor, and supplemental means for preventing movement of the plate relative to the floor.

11. In a constrution of the class described, a supporting floor having a longitudinal guide member longitudinally slotted at its upper side and located below the upper side of the floor, a member slidably mounted in said guide, a bar pivotally connected at one end to said member whereby said bar may be received in the guide or turned to a position where it extends above the floor, and means connected with the free end of the bar adapted to be detachably connected to a motor vehicle placed on the floor for the purpose of holding the same in anchored position.

12. In a construction of the class described, a horizontal floor, a plurality of longitudinal guide members located lengthwise of the floor and below the upper side thereof and having slots lengthwise thereof in their upper sides, a plurality of cylindrical members slidably mounted in each guide member, a bar connected with each of said last members adapted to be turned to pass through the slot thereof to a position below the floor or to an upper position where it extends through the slot above the floor, and means connected with the free ends of each of the bars for engaging with and securing an article placed upon the floor against movement.

13. In a construction of the class described, a supporting floor, a longitudinal guide located in said floor below the upper side thereof and slotted lengthwise at its upper side, a bar, enlarged means at one end of the bar slidably received in said guide, and means for drawing said enlarged means upwardly whereby it is prevented from movement along said guide.

In testimony whereof I affix my signature.

HARVEY L. PATTERSON.